No. 750,352. PATENTED JAN. 26, 1904.
F. W. ERICKSON.
OUTLET BUSHING FOR JUNCTION BOXES.
APPLICATION FILED OCT. 5, 1903.
NO MODEL.
Fig. 1. 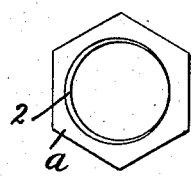 Fig. 2. 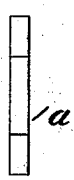 Fig. 3. 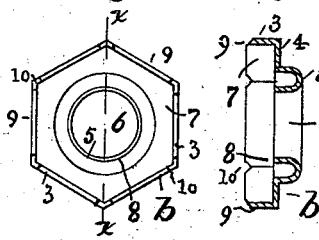 Fig. 4. 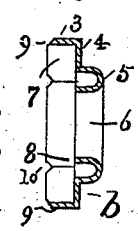
Fig. 2a. 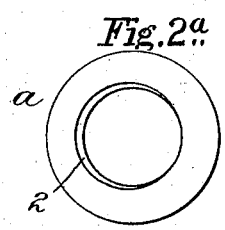 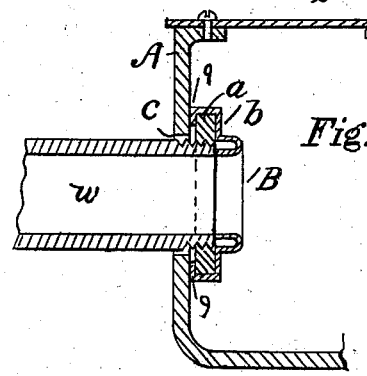 Fig. 5. Fig. 2b. 
WITNESSES: INVENTOR.

No. 750,352. Patented January 26, 1904.

UNITED STATES PATENT OFFICE.

FREDERICK WM. ERICKSON, OF BOSTON, MASSACHUSETTS.

OUTLET-BUSHING FOR JUNCTION-BOXES.

SPECIFICATION forming part of Letters Patent No. 750,352, dated January 26, 1904.

Application filed October 5, 1903. Serial No. 175,899. (No model.)

*To all whom it may concern:*

Be it known that I, FREDERICK WM. ERICKSON, residing at Boston, in the county of Suffolk and State of Massachusetts, have invented certain Improvements in Outlet-Bushings for Junction-Boxes, of which the following is a specification.

The present invention relates to outlet-bushings screwed upon the free ends of interior conduits or of those inside the junction-boxes to guard the insulated conductors from damage otherwise occasioned by the abrasion of the insulation upon the rough edges of the end of the conduit and also to secure the pipe to the junction-box. Such outlet-bushings are commonly provided with an internal thread to screw the same upon the threaded end of the conduit, and as there is considerable strain upon the thread it is necessary that it be of full size and strong in order that the strain shall not strip the thread and permit the conduit to pull away from the junction-box, as sometimes happens with many of the bushings now in use. The invention aims to overcome this defect; and it consists in the device which I will now proceed to describe and claim.

In the drawings which form a part of this specification and illustrate the invention, Figures 1 and 2 are a side and edge view of a hexagonal nut. Fig. 2$^a$ is a side view of a round nut, and Fig. 2$^b$ is a section of such a nut inclosed in a capping. Fig. 3 is a rear view, and Fig. 4 a section on line $x$ $x$ of Fig. 3, of a hollow capping. Fig. 5 is a sectional view of the device attached to a conduit and also to a junction-box.

In the drawings, $a$ represents a thin polygonal iron nut, which is the preferred form, having an internal thread 2 cut therein. Such nut may be pressed from thin plate-iron and a hole punched in its center. It is then held firmly in a pair of jaws and forced onto the tapered end of a tap, and thence upon the straight part thereof, so that a full thread is cut in the nut, the tap going way through the same. The cap $b$ is drawn up into a hexagonal shell from thin sheet metal of any kind—such as iron, brass, copper, or any alloy—so as to provide a squared edge portion 3, a flat washer-like part 4, and an outwardly and inwardly rounding portion 5 with a central orifice 6, whose inner edge is in a plane with the inner surface of the part 4. To complete the device, the cap is placed with the part 5 downward in a die and the nut $a$ dropped into the polygonal space 7 of the cap, and the edges 9 9 are forced over onto the face of the nut by another die to firmly embrace and hold the nut central of the orifice 6, thus providing a bushing consisting of two portions, one adapted to form a smooth rounded entrance for the protection of the insulated conductor and at the same time constitute an abutment for the wall of the junction-box, the second part forming a perfectly-threaded nut adapted to take firmly onto the threaded end of the conduit and hold the same to the wall of the box under all the strain that can come to it.

The advantage of the thread in the nut of the invention is readily seen. It is formed under the best conditions, perfectly full and regular, and is then placed where it can be used to advantage.

I do not confine myself to the precise form shown of either of the parts, for the nut may be of any number of sides to which a wrench can be attached for screwing the same to the conduit, and the shell or cap part may have any form of orifice and swelling or rounding out therefrom for the protection of insulated conductors.

I prefer to form notches 10 at the angles of the squared edges, cutting away so much of the metal in order that the edges may be pressed over onto the face of the nut more readily.

Figs. 2$^a$ and 2$^b$ represent the nut and the completed nut and a covering, respectively, the nut being round in shape, for in many junction-boxes it is desirable not to have sharp angular projections, as they occupy considerable room.

I claim as my invention—

1. An outlet-bushing, consisting of two parts, one being a nut with squared edges and an interior thread, the other composed of thin sheet metal whose edges embrace and hold the nut and whose outer face is provided with an outwardly-flaring circular orifice, as set forth.

2. An outlet-bushing, consisting of an internally-threaded nut with squared edges, and a hollow thin metal part drawn up from ductile metal having an outwardly-rounding central orifice and a peripheral portion covering and embracing the nut with its outer edges turned over onto the same, as set forth.

3. An outlet-bushing, consisting of an internally-threaded nut with squared edges, inclosed in a hollow thin metal part drawn up from ductile metal and embracing the edges and sides of the nut and provided with an outwardly-rounding central orifice whose inner edge is on a plane with the face of the inclosed nut, as set forth.

4. An outlet-bushing, consisting of an internally-threaded nut with polygonal sides and right-angled edges inclosed in a hollow thin metal part drawn up from ductile metal and embracing the edges and sides of the nut and provided with an outwardly and inwardly rounding central orifice whose inner edge is on a plane with the face of the inclosed nut, as set forth.

5. An outlet-bushing, consisting of two parts, one being a nut with an interior thread, the other composed of thin sheet metal whose edges embrace and hold the nut, and whose outer face is provided with an outwardly-flaring circular orifice which is surrounded with a ring-like protuberance, as set forth.

In testimony whereof I have signed my name to this specification, in the presence of two subscribing witnesses, this 30th day of September, 1903.

FREDERICK WM. ERICKSON.

Witnesses:
 THOMAS E. PIGOTT,
 WALTER B. PERKINS